United States Patent
Seo et al.

(10) Patent No.: US 12,043,286 B2
(45) Date of Patent: Jul. 23, 2024

(54) METHOD AND SYSTEM FOR DETECTING AND ALERTING COLLISION BY AUTONOMOUS ROBOT BASED ON MULTI-SENSOR LSTM

(71) Applicant: Electronics and Telecommunications Research Institute, Daejeon (KR)

(72) Inventors: Seonghun Seo, Daejeon (KR); Eun Hye Kim, Daejeon (KR)

(73) Assignee: ELECTRONICS AND TELECOMMUNICATIONS RESEARCH INSTITUTE, Daejeon (KR)

(*) Notice: Subject to any disclaimer, the term of this patent is extended or adjusted under 35 U.S.C. 154(b) by 357 days.

(21) Appl. No.: 17/502,769

(22) Filed: Oct. 15, 2021

(65) Prior Publication Data
US 2022/0204038 A1    Jun. 30, 2022

(30) Foreign Application Priority Data
Dec. 31, 2020   (KR) .................. 10-2020-0189696

(51) Int. Cl.
  G01C 22/00     (2006.01)
  B60W 60/00     (2020.01)
  (Continued)

(52) U.S. Cl.
  CPC ......... B60W 60/0016 (2020.02); G01P 15/18 (2013.01); G01S 17/89 (2013.01);
  (Continued)

(58) Field of Classification Search
  CPC .......... B60W 60/0016; B60W 2420/52; G01S 17/931; G01S 17/89; G06V 20/58;
  (Continued)

(56) References Cited

U.S. PATENT DOCUMENTS 10,663,974 B2   5/2020   Suk et al.
2012/0081542 A1 4/2012   Suk et al.
              (Continued)

FOREIGN PATENT DOCUMENTS

KR   10-2004-0086937   10/2004
KR   10-2007-0115244   12/2007
              (Continued)

OTHER PUBLICATIONS

Yuchi Tian, Kexin Pei, Suman Jana, and Baishakhi Ray. 2018. DeepTest: Automated Testing of Deep-Neural-Network-driven Autonomous Cars. In ICSE '18: ICSE '18: 40th International Conference on Software Engineering, May 27-Jun. 3, 2018, Gothenburg, Sweden. ACM, New York, NY, USA.*
              (Continued)

*Primary Examiner* — Adam M Alharbi
(74) *Attorney, Agent, or Firm* — KILE PARK REED & HOUTTEMAN PLLC (57) ABSTRACT

A method and system for detecting a collision by an autonomous robot based on a multi-sensor long short-term memory (LSTM) are disclosed. The method includes generating an input of an LSTM model by combining an input image received from an autonomous robot, light detection and ranging (LiDAR) distance information, and acceleration information, learning a collision alert situation by inputting the input to the LSTM model, and determining a collision situation using an output of the LSTM model and a fully connected neural network (FNN) model.

13 Claims, 8 Drawing Sheets

(51) Int. Cl.
*G01P 15/18* (2013.01)
*G01S 17/89* (2020.01)
*G01S 17/931* (2020.01)
*G06F 18/213* (2023.01)
*G06F 18/25* (2023.01)
*G06V 20/58* (2022.01)
*G08G 1/16* (2006.01)

(52) U.S. Cl.
CPC .......... *G01S 17/931* (2020.01); *G06F 18/213* (2023.01); *G06F 18/251* (2023.01); *G06V 20/58* (2022.01); *G08G 1/16* (2013.01); *B60W 2420/408* (2024.01)

(58) Field of Classification Search
CPC ...... G06F 18/251; G06F 18/213; G01P 15/18; G08G 1/16
See application file for complete search history.

(56) References Cited

U.S. PATENT DOCUMENTS

2020/0033845 A1  1/2020  Park
2021/0003405 A1*  1/2021  Choi ...................... G01S 17/89

FOREIGN PATENT DOCUMENTS

| KR | 10-2095152 | 3/2020 |
| KR | 10-2169879 | 10/2020 |
| KR | 10-2021-0040166 | 4/2021 |

OTHER PUBLICATIONS

Mark Strickland1, Georgios Fainekos1, Heni Ben Amor. Deep Predictive Models for Collision Risk Assessment in Autonomous Driving, Mar. 29, 2018.*

* cited by examiner

METHOD AND SYSTEM FOR DETECTING AND ALERTING COLLISION BY AUTONOMOUS ROBOT BASED ON MULTI-SENSOR LSTM

CROSS-REFERENCE TO RELATED APPLICATION

This application claims the benefit of Korean Patent Application No. 10-2020-0189696 filed on Dec. 31, 2020, in the Korean Intellectual Property Office, the entire disclosure of which is incorporated herein by reference for all purposes.

BACKGROUND

1. Field of the Invention

One or more example embodiments relate to a method and system for detecting a collision by an autonomous robot, and more particularly, to a device for providing a collision alert and detecting an obstacle on a path traveled by the autonomous robot using an input image of a camera installed on a robot, light detecting and ranging (LiDAR) distance information, and acceleration information of an acceleration sensor.

2. Description of the Related Art

Autonomous driving (AD) performed by an autonomous robot may mean a robot moving autonomously along a preset path to a destination without manual intervention from a person. However, because the robot moves along such preset path, various obstacles including people, bicycles, vehicles, and newly installed structures may be present on an existing path by the time the robot performs AD.

Thus, there is a demand for methods that may detect a collision between an obstacle and an autonomous robot using sensor information and provide an alert before the collision occurs.

SUMMARY

Example embodiments provide a method and system for detecting a collision that may reduce disadvantages of sensors using tightly-coupled measurement values of the sensors providing different information than another.

According to an aspect, there is provided a method of detecting a collision by an autonomous robot, the method including generating an input of a long short-term memory (LSTM) model by combining an input image received from an autonomous robot, light detection and ranging (LiDAR) distance information, and acceleration information, learning a collision alert situation by inputting the input to the LSTM model, and determining a collision situation using an output of the LSTM model and a fully connected neural network (FNN) model.

The LSTM model may learn, when an obstacle is detected using the LiDAR distance information, but the obstacle is not detected using the input image, as a normal situation, learn, when an obstacle is detected using the LiDAR distance information, and the obstacle is detected using the input image, as a collision alert situation, and learn, when the LiDAR distance information and a feature point map of the input image decrease, but the acceleration information increases, as the collision situation.

The determining of the collision situation may include, from among three outputs (normal driving, collision alert, collision detection) generated by the FNN model, selecting an output in which a probability distribution value is the greatest based on a normal distribution of the three outputs, and determining the collision situation based on the selected output.

The method may further include determining a cost function for optimizing a training model by comparing the collision situation determined using the FNN model and an actual situation, and optimizing a training model of the LSTM model and a training model of the FNN model based on the cost function.

The method may further include generating, from the input image, a feature point map from the input image. The generating of the input of the LSTM model may include combining the feature point map of the input image, the LiDAR distance information, and the acceleration information.

The generating of the feature point map may include extracting feature points from the input image using a convolution filter of a preset size and reducing a size of the input image, linearizing the extracted feature points, and dividing the linearized feature points by a preset size and generating the feature point map using representative values of the divided feature points.

According to another aspect, there is provided a system for detecting a collision by an autonomous robot, the system including an LSTM model part configured to generate an input of an LSTM model by combining an input image received from an autonomous robot, LiDAR distance information, and acceleration information and learn a collision alert situation by inputting the input to the LSTM model, and an FNN model part configured to determine a collision situation using an output of the LSTM model and an FNN model.

The LSTM model may learn, when an obstacle is detected using the LiDAR distance information, but the obstacle is not detected using the input image, as a normal situation, learn, when an obstacle is detected using the LiDAR distance information, and the obstacle is detected using the input image, as a collision alert situation, and learn, when the LiDAR distance information and a feature point map of the input image decrease, but the acceleration information increases, as the collision situation.

The FNN model part may select, from among three outputs (normal driving, collision alert, collision detection) generated by the FNN model, an output in which a probability distribution value is the greatest based on a normal distribution of the three outputs and determine the collision situation based on the selected output.

The FNN model part may determine a cost function for optimizing a training model by comparing the collision situation determined using the FNN model and an actual situation, and optimize a training model of the FNN model based on the cost function. The LSTM model may optimize a training model of the LSTM model based on the cost function.

The system may further include a feature point map generator configured to generate, from the input image, a feature point map of the input image. The LSTM model part may combine the feature point map of the input image, the LiDAR distance information, and the acceleration information.

The feature point map generator may extract feature points from the input image using a convolution filter of a preset size, reduce a size of the input image, linearize the extracted feature points, divide the linearized feature points by a preset size, and generate the feature point map using representative values of the divided feature points.

Additional aspects of example embodiments will be set forth in part in the description which follows and, in part, will be apparent from the description, or may be learned by practice of the disclosure.

According to an example embodiment, using tightly-coupled sensor measurement values that each provide different information may reduce a disadvantage of each sensor, thereby making a collision detection system more stable.

According to an example embodiment, notifying a user about an abnormal situation may facilitate an immediate response when a possible collision with a detected obstacle is predicted or a collision occurs.

According to an example embodiment, notifying a user about an abnormal situation and facilitating an immediate response may ensure a stable operation of an autonomous robot.

BRIEF DESCRIPTION OF THE DRAWINGS

These and/or other aspects, features, and advantages of the invention will become apparent and more readily appreciated from the following description of example embodiments, taken in conjunction with the accompanying drawings of which.

DETAILED DESCRIPTION

Hereinafter, some examples will be described in detail with reference to the accompanying drawings. However, various alterations and modifications may be made to the examples. Here, the examples are not construed as limited to the disclosure and should be understood to include all changes, equivalents, and replacements within the idea and the technical scope of the disclosure.

The terminology used herein is for the purpose of describing particular examples only and is not to be limiting of the examples. As used herein, the singular forms "a", "an", and "the" are intended to include the plural forms as well, unless the context clearly indicates otherwise. It will be further understood that the terms "comprises/comprising" and/or "includes/including" when used herein, specify the presence of stated features, integers, steps, operations, elements, and/or components, but do not preclude the presence or addition of one or more other features, integers, steps, operations, elements, components and/or groups thereof.

When describing the examples with reference to the accompanying drawings, like reference numerals refer to like constituent elements and a repeated description related thereto will be omitted. In the description of examples, detailed description of well-known related structures or functions will be omitted when it is deemed that such description will cause ambiguous interpretation of the present disclosure.

Hereinafter, example embodiments will be described in detail with reference to the accompanying drawings.

Figure 1:
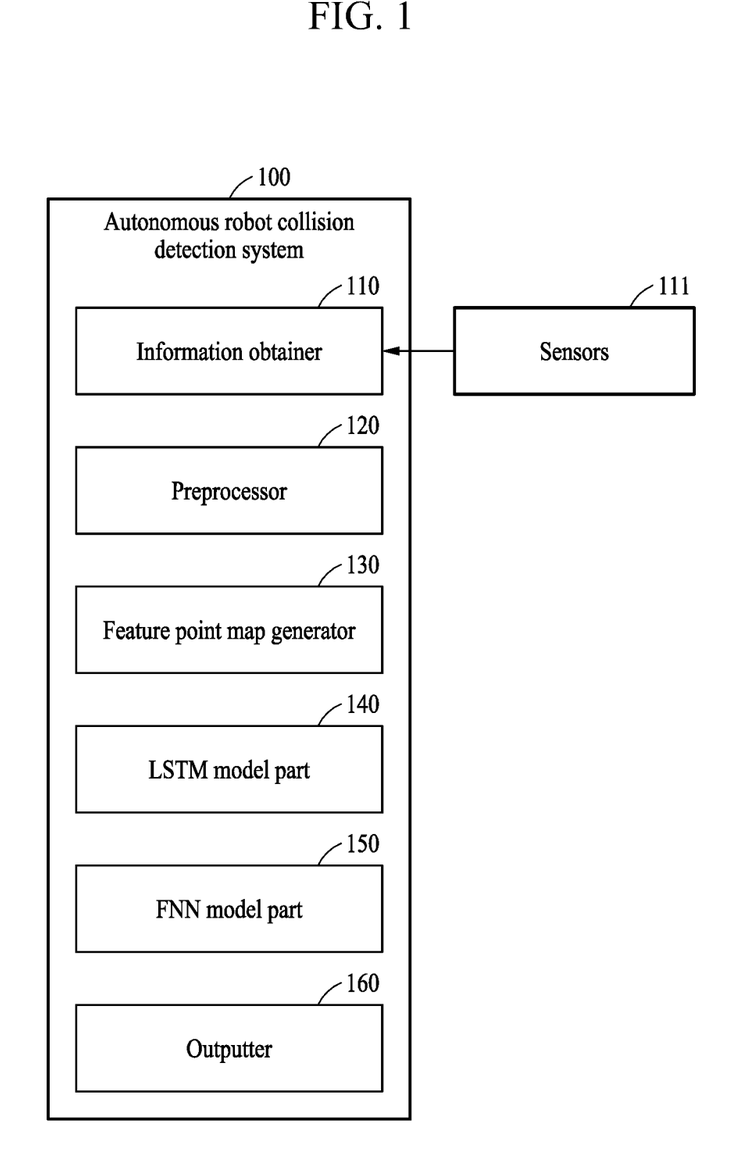
FIG. 1 is a diagram illustrating an example of a system for detecting a collision by an autonomous robot according to an example embodiment.

FIG. 1 is a diagram illustrating an example of a system for detecting a collision by an autonomous robot according to an example embodiment.

As illustrated in FIG. 1, a system for detecting a collision by an autonomous robot, hereinafter simply an autonomous robot collision detection system 100, may include an information obtainer 110, a preprocessor 120, a feature point map generator 130, a long short-term memory (LSTM) model part 140, and a fully connected neural network (FNN) model part 150, and an outputter 160. The information obtainer 110, the preprocessor 120, the feature point map generator 130, the LSTM model part 140, the FNN model part 150, and the outputter 160 may be different processors, or separate modules included in a program executed by a single processor.

The autonomous robot collision detection system 100 may be included in a server or a terminal separate from the autonomous robot, or may be included in the autonomous robot. When the autonomous robot collision detection system 100 is included in the autonomous robot, the information obtainer 110 may be replaced by sensors 111.

The information obtainer 110 may obtain, from the sensors 111 installed on the robot, sensor information at a preset time interval or in real time. For example, the information obtainer 110 may be a communicator that allows wireless communication with a robot and wirelessly receive the sensor information from the robot. The sensors 111 may include a camera, light detecting and ranging (LiDAR), and an acceleration sensor. The sensor information may include an input image generated from the camera capturing a front of the robot, point cloud information generated from LiDAR in 360 degrees (°)(hereinafter simply 360° point cloud information) based on a position of an installed sensor, and three-axis acceleration information generated from an acceleration sensor based on a sensor frame.

The preprocessor 120 may preprocess the sensor information obtained by the information obtainer 110 from the sensors 111 to be usable in an artificial neural network (ANN) model. For example, the preprocessor 120 may output, to the LSTM model part 140, distance information extracted from the 360° point cloud information and the acceleration information obtained by filtering the three-axis acceleration information. The preprocessor 120 may preprocess the input image and output the input image to the feature point map generator 130.

The feature point map generator 130 may generate, from the preprocessed input image, a feature point map of the input image. The feature point map generator 130 may extract feature points from the input image using a convolution filter of a preset size and reduce a size of the input image. The feature point map generator 130 may then linearize the extracted feature points. The feature point map generator 130 may divide the linearized feature points by a preset size and generate the feature point map using representative values of the divided feature points.

The LSTM model part 140 may generate an input of an LSTM model by combining the input image, LiDAR distance information, and the acceleration information. The LSTM model part 140 may combine the feature point map of the input image output from the feature point map generator 130, the LiDAR distance information output from the preprocessor 120, and the acceleration information, and thus generate the input of the LSTM model.

In addition, the LSTM model part 140 may learn a collision alert situation by inputting the generated input to the LSTM model.

In a case in which the LSTM model is not able to detect an obstacle using the input image, and a distance between the obstacle and the autonomous robot included in the LiDAR distance information is sufficiently great such that there is no collision risk, the LSTM model may learn a normal situation.

In a case in which the LSTM model detects an obstacle using the input image, and a distance between the obstacle and the autonomous robot included in the LiDAR distance information is in a range in which there is no collision risk, the LSTM model may learn a collision alert situation. In a case in which the LSTM model is not able to detect an obstacle using the input image, but a distance between the obstacle and the autonomous robot included in the LiDAR distance information is in a range in which there is collision risk, the LSTM model may learn a collision alert situation.

In a case in which the feature point map of the input image decreases, a distance between the obstacle and the autonomous robot included in the LiDAR distance information is a short distance that is less than a threshold, and the acceleration information increases, the LSTM model may learn a collision situation.

The FNN model part 150 may determine the collision situation using an output of the LSTM model and an FNN model. The FNN model part 150 may select, from among three outputs (normal driving, collision alert, collision detection) generated by the FNN model from which an output of the LSTM model is received, the greatest probability distribution value based on a normal distribution of the three outputs and determine the collision situation based on the selected output.

The FNN model part 150 may determine a cost function for optimizing a training model by comparing the collision situation determined using the FNN model and an actual situation. The feature point map generator 130, the LSTM model part 140, and the FNN model part 150 may optimize a training model of the feature point map generator 130, a training model of the LSTM model, and a training model of the FNN model based on the cost function.

The outputter 160 may output a result of the determining, which is determined by the FNN model part 150. The outputter 160 may provide, to the user, a result of detecting an object in a camera image, LiDAR cloud point information, and information from the acceleration sensor. The outputter 160 may provide classified results associated with normal driving, collision alert, and collision detection to the user.

The autonomous robot collision detection system 100 may efficiently detect an obstacle in front on a driving path by combining an input image from a camera installed on a robot, LiDAR distance information, and acceleration information from an acceleration sensor. The autonomous robot collision detection system 100 may notify a user about an abnormal situation when a possible collision with a detected obstacle is predicted or a collision occurs, thereby facilitating an immediate response.

In addition, the autonomous robot collision detection system 100 may notify a user about an abnormal situation and facilitate an immediate response, thereby ensuring stable operation of the autonomous robot.

Figure 2:
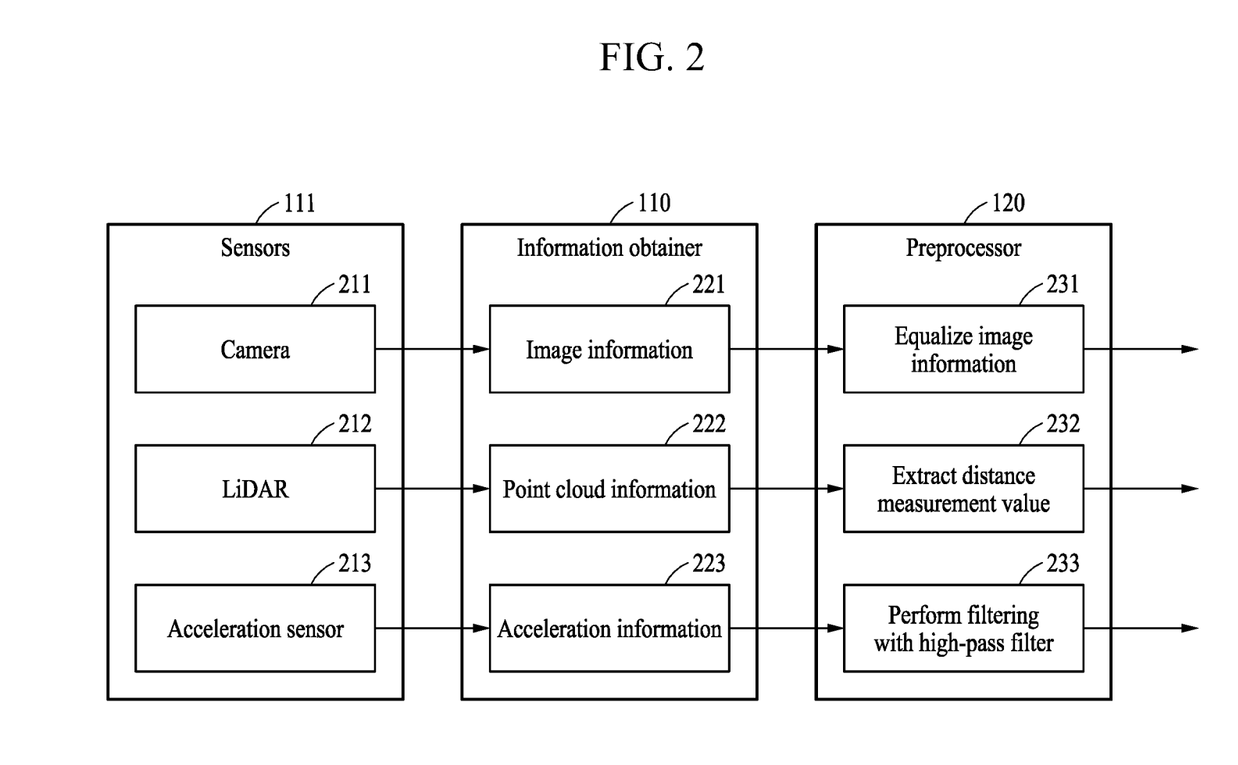
FIG. 2 is a diagram illustrating an example of operations of sensors, an information obtainer, and a preprocessor of a system for detecting a collision by an autonomous robot according to an example embodiment.

FIG. 2 is a diagram illustrating an example of operations of the sensors 111, the information obtainer 110, and the preprocessor 120 of an autonomous robot collision detection system according to an example embodiment.

A camera 211 of the sensors 111 may generate an input image by capturing a front of an autonomous robot and transmit image information 221 including the generated input image to the information obtainer 110. LiDAR 212 of the sensors 111 may generate 360° point cloud information 222 based on a position of an installed sensor and transmit the point cloud information 222 to the information obtainer 110. An acceleration sensor 213 of the sensors 111 may generate three-axis acceleration information 223 based on a sensor frame and transmit the three-axis acceleration information 223 to the information obtainer 110.

The information obtainer 110 may transmit the received image information 221, the received 360° point cloud information 222, and the received three-axis acceleration information 223 to the preprocessor 120.

The preprocessor 120 may perform a preprocessing operation such as distortion correction by a camera lens, illumination effect correction, and contrast equalization on the input image included in the image information 221, and equalize the image information 221 in operation 231.

The preprocessor 120 may perform preprocessing to extract, from the 360° point cloud information 222, distance information associated with a point cloud in front of an autonomous robot on a movement path in operation 232.

The preprocessor 120 may remove three-axis gravitational acceleration and a sensor bias from the three-axis acceleration information 223, perform preprocessing with a high-pass filter for filtering in operation 233, and output acceleration information that detects a sudden change in acceleration more clearly.

Figure 3:
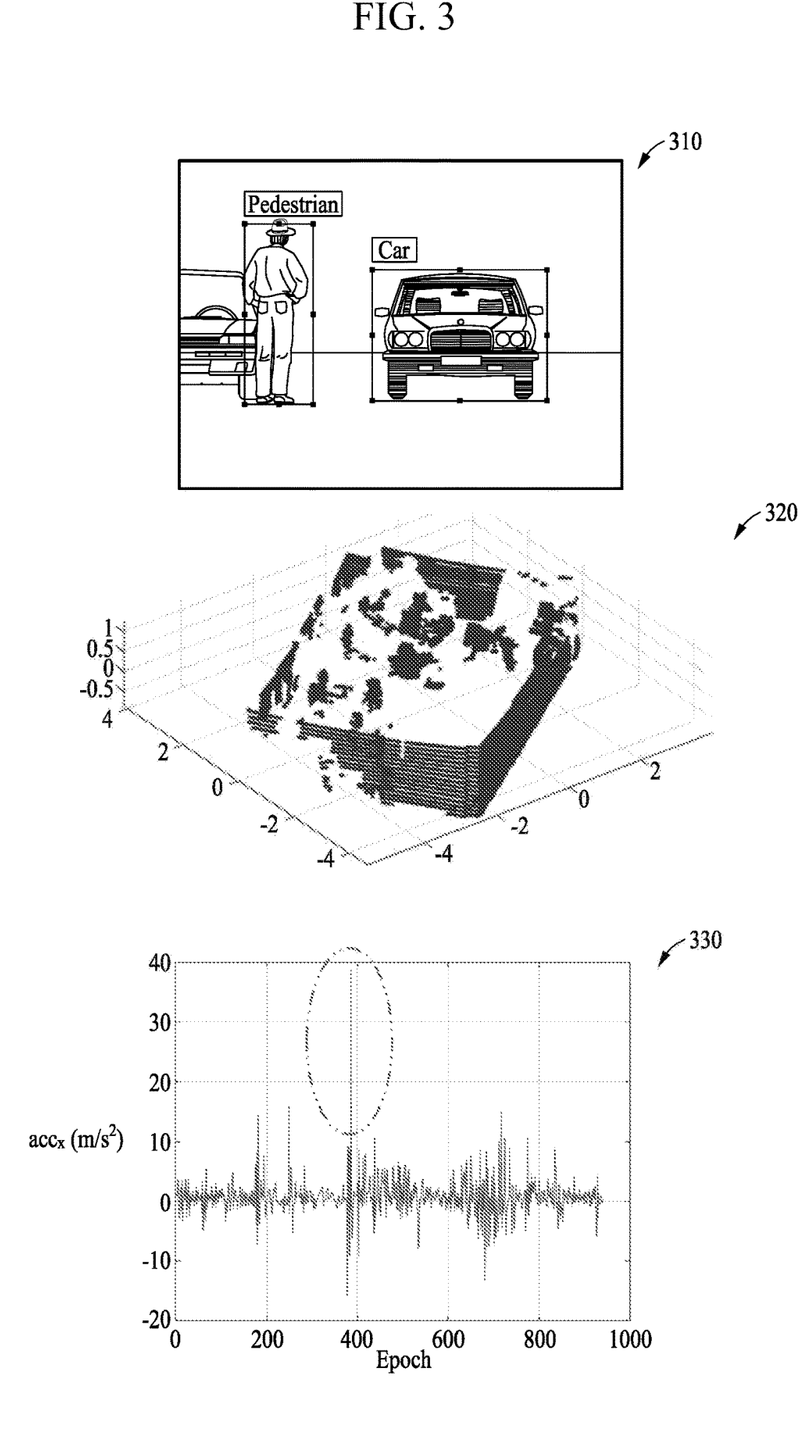
FIG. 3 is a diagram illustrating examples of sets of information obtained from a sensor of a system for detecting a collision by an autonomous robot according to example embodiments.

FIG. 3 is a diagram illustrating examples of sets of information obtained from a sensor of an autonomous robot collision detection system according to example embodiments.

As illustrated in FIG. 3, image information 310 transmitted by the camera 211 of the sensors 111 may include an input image in which an object such as a person, a bicycle, a structure, and the like in an image is detected through an image processing process.

As illustrated in FIG. 3, point cloud information 320 transmitted by the LiDAR 212 of the sensors 111 may be information providing a distance and direction angle of a surrounding object.

As illustrated in FIG. 3, three-axis acceleration information 330 transmitted by the acceleration sensor 213 of the sensors 111 may be information obtained by converting an amount of impact received when a collision occurs between an autonomous robot and an obstacle. A portion indicated by a dotted circle in the three-axis acceleration information 330 may be an acceleration value obtained by converting the amount of collision impact.

Figure 4:
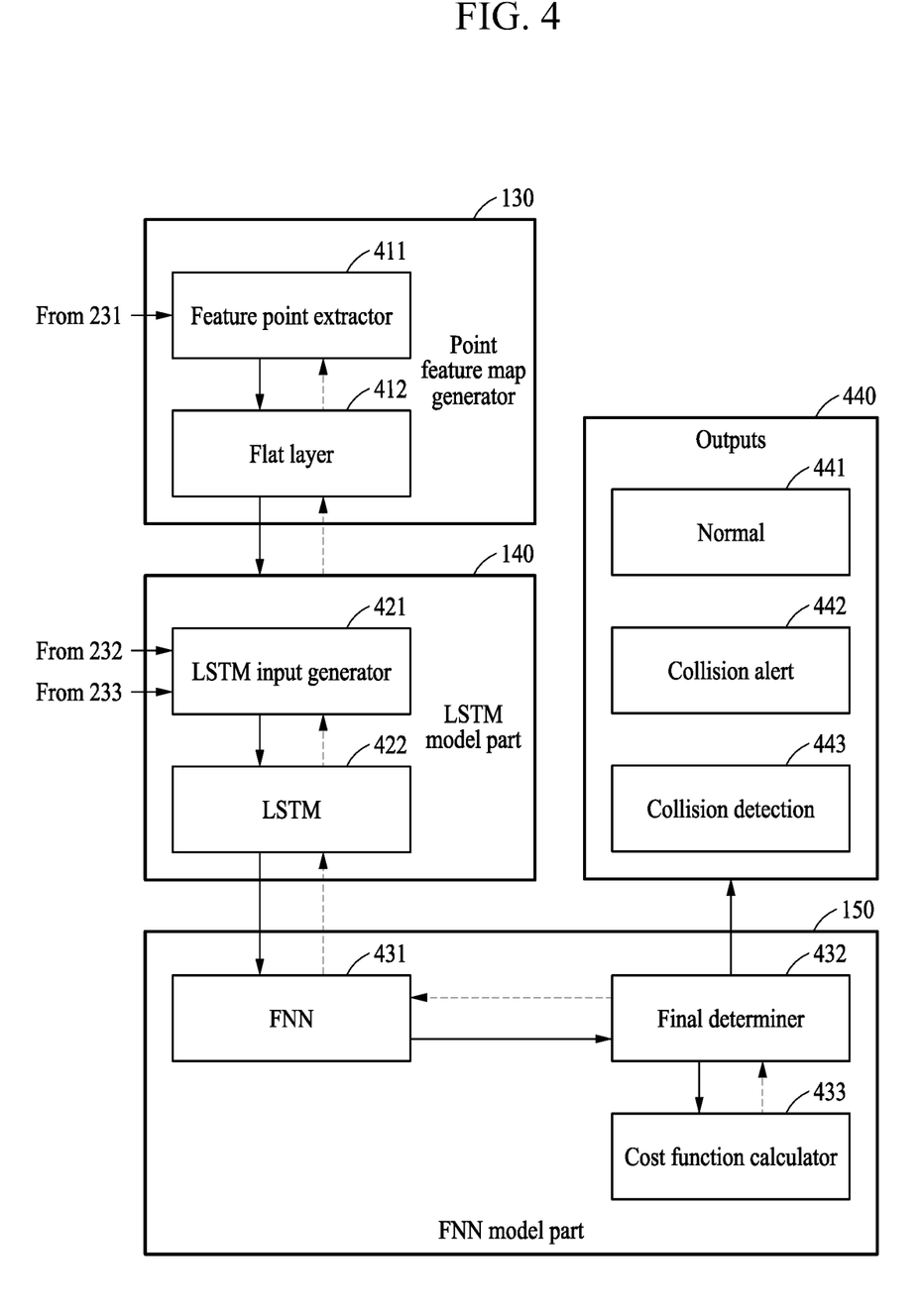
FIG. 4 is a diagram illustrating an example of operations of a feature point map generator, a long short-term memory (LSTM) model part, and a fully convolutional neural network (FNN) model part of a system for detecting a collision by an autonomous robot according to an example embodiment.

FIG. 4 is a diagram illustrating an example of operations of the feature point map generator 130, the LSTM model part 140, and the FNN model part 150 of an autonomous robot collision detection system according to an example embodiment.

A feature point extractor 411 of the feature point map generator 130 may reduce a size of an input image by passing the input image of an M×N size through a convolution filter and obtain a feature point map. The feature point extractor 411 may then perform an extraction (or pooling) process and reduce a size of the obtained feature point map while maintaining feature information.

The feature point extractor 411 may reduce a size of the feature point map by repeating the above-described process until the size corresponds to an input size of an LSTM model 422, and thus output the feature point map having a size corresponding to the input size of the LSTM model 422.

A flat layer 412 may convert the feature point map output from the feature point extractor 411 into a 1×K matrix and transmit the converted feature point map to the LSTM model part 140.

An LSTM input generator 421 of the LSTM model part 140 may combine the feature point map output from the feature point map generator 130, LiDAR distance information output from the preprocessor 120, and acceleration information, and generate an input of the LSTM model 422.

The LSTM model part 140 may input the input generated by the LSTM input generator 421 to the LSTM model 422 and learn a collision alert situation. When values of an image, LiDAR, and an acceleration sensor continuously obtained by movement of the robot are used as inputs, a result of the learning from a previous time point may be reflected at a current time point, and thus an LSTM may effectively learn and determine a collision alert situation that occurs differently than a normal driving situation of a robot.

The FNN model part 150 may receive an output cell of the LSTM model 422 to calculate a cost function for determining a collision situation and optimizing a training model. The number of output cells of the LSTM model 422 may be relatively greater than the number of input cells of a softmax function that is a final determination function to reduce a loss of information.

Thus, through a hidden layer, an FNN model 431 may generate three outputs of normal driving 441, collision alert 442, and collision detection 443 of the robot with respect to the input of the LSTM. In addition, the softmax function of a final determiner 432 may select, from among the three outputs using a normal distribution of the three outputs, an output with the greatest probability distribution value, and determine the collision situation based on the selected output. The final determiner 432 may transmit, to the outputter 160, outputs 440 including one of the normal driving 441, the collision alert 442, and the collision detection 443 based on a result of the determining. When a received output is the collision alert 442 or the collision detection 443, the outputter 160 may notify a user about a possible collision of an autonomous robot and an occurrence of a collision through an alarm.

A cost function calculator 433 may determine the cost function for optimizing the training model by comparing the collision situation determined using the FNN model 431 and an actual situation. The cost function calculator 433 may transmit the cost function to the feature point map generator 130, the LSTM model part 140, and the FNN model part 150 through a back-propagation method and repeatedly perform a process of optimizing a training model of the feature point map generator 130, a training model of the LSTM model part 140, and a training model of the FNN model part 150 based on the cost function for the feature point map generator 130, the LSTM model part 140, and the FNN model part 150.

Figure 5:
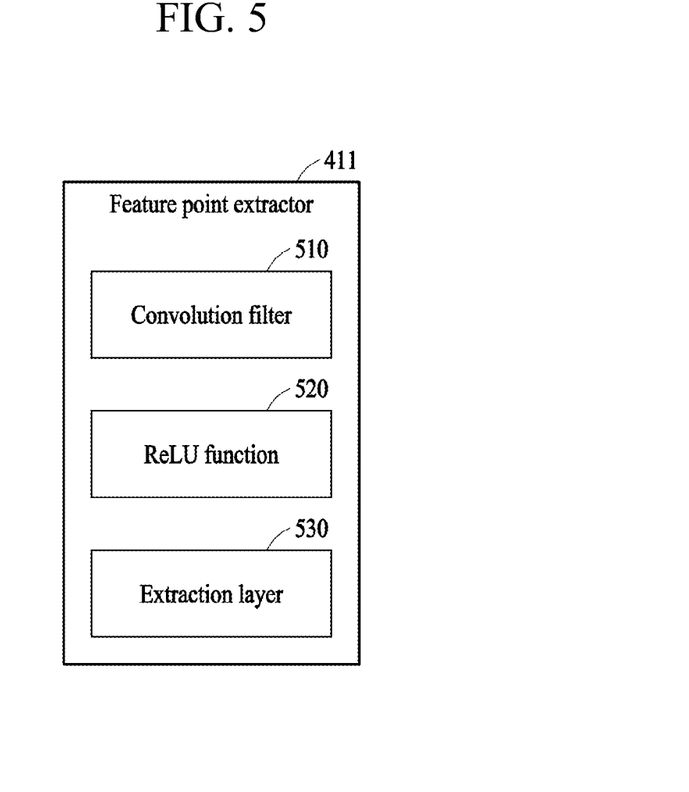
FIG. 5 is a diagram illustrating an example of a feature point extractor according to an example embodiment.

FIG. 5 is a diagram illustrating an example of the feature point extractor 411 according to an example embodiment.

As illustrated in FIG. 5, the feature point extractor 411 may include a convolution filter 510, a rectified linear unit (ReLU) activation function 520, and an extraction layer 530.

An input image may be input with a size of M×N in pixel units. For example, when the most common 640×480 image is used, a total of 307,200 pixels may be present. When these pixels are used as an input, the performance of an artificial intelligence (AI) model may be degraded by an increase in an image processing time. Thus, the feature point extractor 411 may extract feature points by moving the convolution filter 510 of a size of J×H (e.g., J<M, H<N) up, down, left, and right. A size of the input image may be reduced by a feature of the convolution filter 510.

The feature points extracted using the convolution filter 510 may be input to the ReLU activation function 520.

The ReLU activation function 520 may linearize values of the extracted feature points and make a residual value other than a position of feature points to 0, and thus improve the performance of feature point extraction and speed of image processing.

The extraction layer 530 may divide, by a preset size, a map of feature points that have passed through the ReLU activation function 520, extract a representative value (e.g., the greatest value) for each divided region, and generate a feature point map reduced to V×B (e.g., V<J, B<H).

Figure 6:
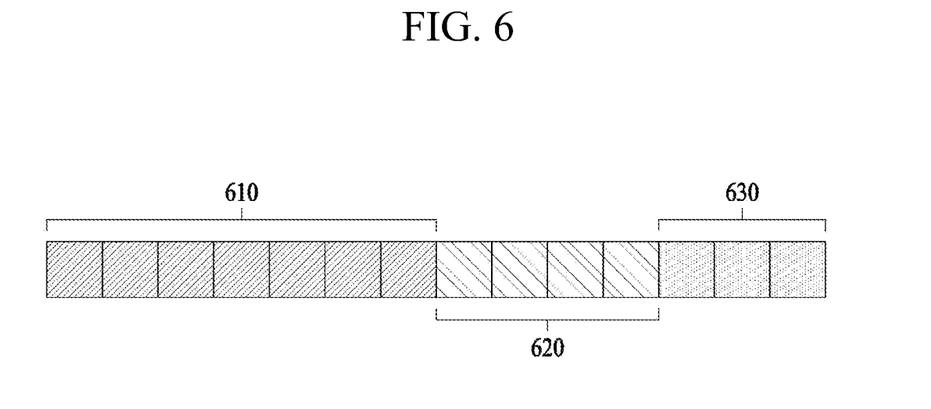
FIG. 6 is a diagram illustrating an example of a generated input of an LSTM model according to an example embodiment.

FIG. 6 is a diagram illustrating an example of a generated input of an LSTM model according to an example embodiment.

As illustrated in FIG. 6, an input of the LSTM model may be information that is a combination of a feature point map 610 converted into a 1×K matrix, LiDAR distance information 620 including a distance to an obstacle in front of a driving path, and a three-dimensional (3D) acceleration value 630 measured by an acceleration sensor.

Figure 7:
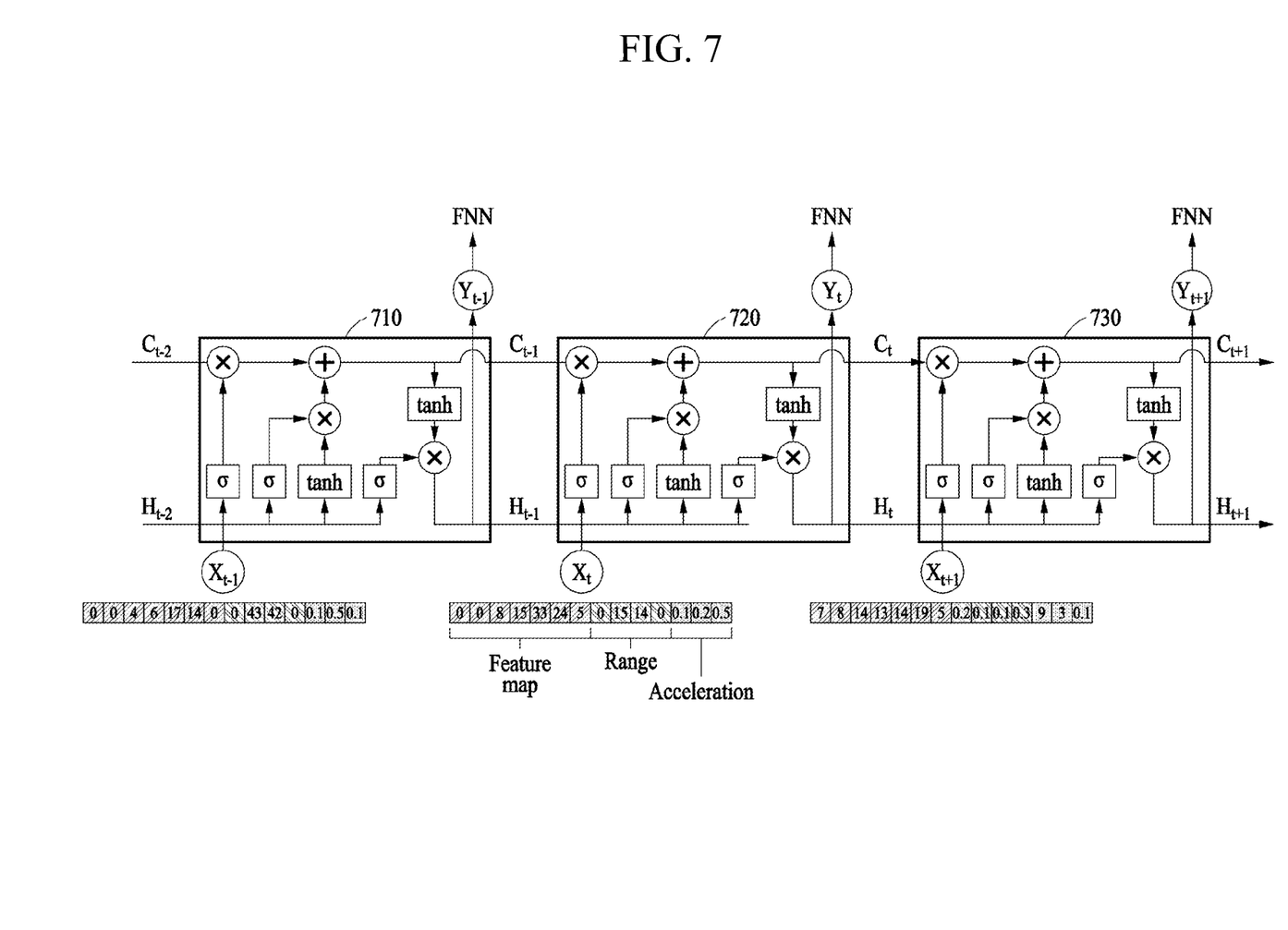
FIG. 7 is a diagram illustrating an example of operations of an LSTM model according to an example embodiment.

FIG. 7 is a diagram illustrating an example of operations of an LSTM model according to an example embodiment.

To determine when a collision is predicted or a collision occurs, information associated with a time point before a collision issue arises may need to be obtained through each of sensors because factors such as a mean or variance of a measured value based on a surrounding environment may change. In addition, the performance of preventing the collision may be improved because a state change of an object that is collidable may be detected in advance when feature points change in an image according to a time are used together as inputs illustrated in FIG. 6.

$X_t$, $Y_t$, $C_t$, and $H_t$ of FIG. 7 may indicate an input, an output, a long-term memory cell, and a short-term previous output of an LSTM, respectively, at each time point. The long-term memory cell may store state information that is generated and updated in input information in a long term perspective. The short-term previous output may be used to train and classify together with an input of a current time point using the output of the LSTM at an immediate previous time point.

Operation 710 may be an example of an operation when an object considered as an obstacle is present in front. By LiDAR using a high directional laser, an object located farther than a distance at which an object is detected through the camera may be identified. In operation 710, an input may have a low value of a feature point map, and a value of an acceleration sensor may have only an acceleration component value by a movement of the robot. Thus, when the input having the foregoing features is input to an LSTM model, the LSTM model may transmit a cell state and a short-term previous output to be used for an input of a next time point after the input passes through a forget gate, an input gate, and an output gate.

In operation 720, when a robot moves closer to an object considered as the obstacle, the object may be detected as the obstacle through a camera image. Thus, a value of a feature point map may increase, and a value of a distance measurement may decrease. The LSTM model may transmit the cell state and the short-term previous output to be used for an input of the next time point after the input passes through the forget gate, the input gate, and the output gate. The LSTM model may learn and classify an obstacle alert situation.

Operation 730 may be a situation in which an autonomous robot collides into the obstacle. The obstacle may be in contact with the autonomous robot, and thus values of a feature point map in an image and LiDAR distance information may greatly decrease. However, an acceleration value having a greater value than a normal driving environment based on an axis of an acceleration sensor in a direction in which a robot collides with an obstacle may be present. Thus, the LSTM model may learn and classify that a current state is a collision state through the cell state having a previous normal state, obstacle detection, and collision alert information and the short-term previous input.

Figure 8:
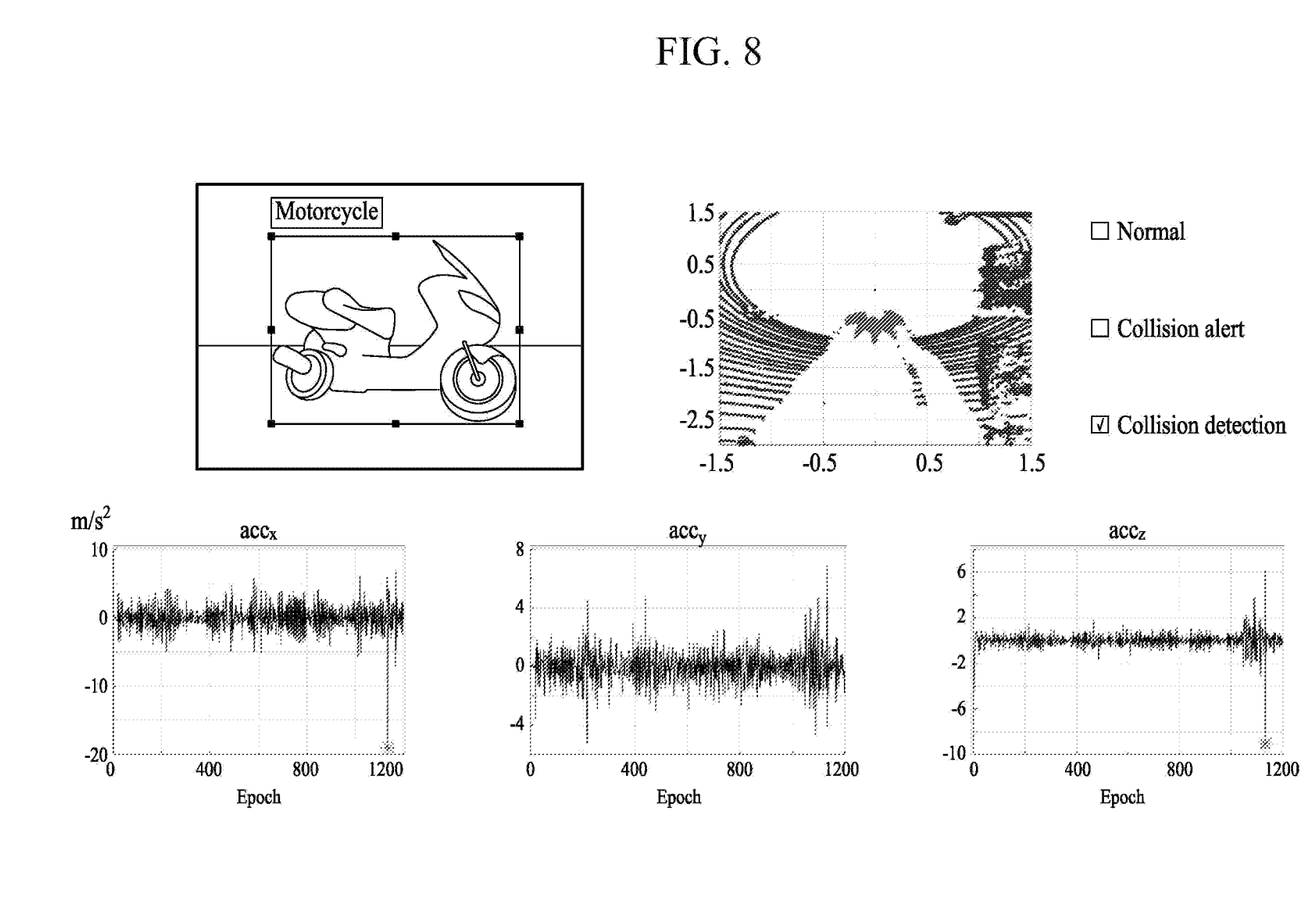
FIG. 8 is a diagram illustrating an example of an output user interface (UI) of a system for detecting a collision by an autonomous robot according to an example embodiment.

FIG. 8 is a diagram illustrating an example of an output user interface (UI) of an autonomous robot collision detection system according to an example embodiment.

The outputter 160 may include at least one of an image outputter, a LiDAR point cloud information outputter, and an acceleration sensor outputter. As illustrated in FIG. 8, an output UI provided by the outputter 160 to a user may include outputs of an image, LiDAR point cloud information, acceleration sensor information, and a result of determining a collision situation.

The image outputter may detect an object in an input image at every time point to indicate that an obstacle is present in a movement path.

The LiDAR point cloud information outputter may output the LiDAR point cloud information at a time point at which an image is input through LiDAR, and a point cloud on a movement path may be represented in red.

The acceleration sensor outputter may output a value of a three-axis acceleration sensor passing through a high-pass filter.

When there is no collision risk in a normal driving situation, a checkbox "normal" may be checked and represented. When distance information of a LiDAR measurement value for an obstacle detected in front is in a radius indicating a collision risk, a checkbox "collision alert" may be checked and represented. When an autonomous robot collides into the obstacle, an abnormal value of the acceleration sensor may generate a detection message and a sign, and a checkbox "collision detection" may be checked and represented.

Figure 9:
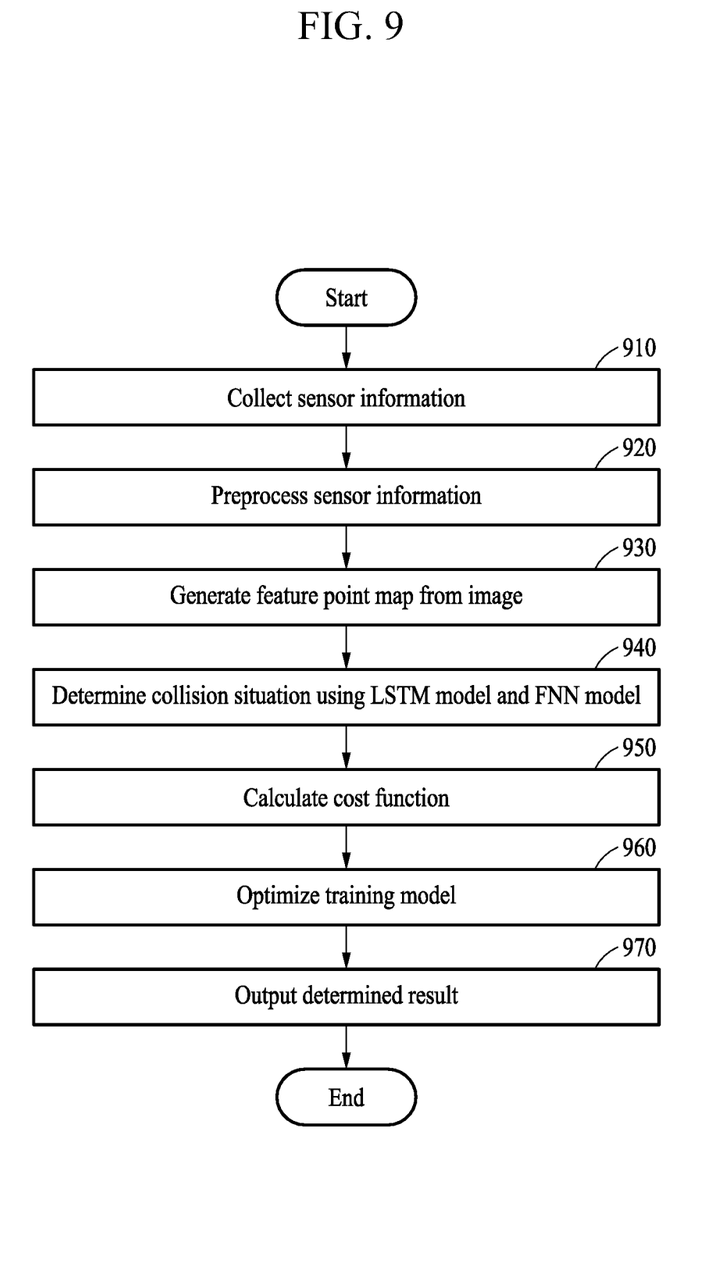
FIG. 9 is a flowchart illustrating an example of a method of detecting a collision by an autonomous robot according to an example embodiment.

FIG. 9 is a flowchart illustrating an example of an autonomous robot collision detection method according to an example embodiment.

In operation 910, the information obtainer 110 may obtain sensor information from the sensors 111 installed on a robot at a preset time interval or in real time. For example, the sensor information may include an input image generated from the camera capturing a front of the robot, 360° point cloud information generated from LiDAR based on a position of an installed sensor, and three-axis acceleration information generated from an acceleration sensor based on a sensor frame.

In operation 920, the preprocessor 120 may preprocess the sensor information obtained in operation 910 to be usable in an ANN model. For example, the preprocessor 120 may output, to the LSTM model part 140, distance information extracted from the 360° point cloud information and the acceleration information obtained by filtering the three-axis acceleration information. The preprocessor 120 may preprocess the input image and output the input image to the feature point map generator 130.

In operation 930, the feature point map generator 130 may generate, from the input image preprocessed in operation 920, a feature point map of the input image. The feature point map generator 130 may extract feature points from the input image using a convolution filter of a preset size and reduce a size of the input image. The feature point map generator 130 may then linearize the extracted feature points. The feature point map generator 130 may divide the linearized feature points by a preset size and generate the feature point map using representative values of the divided feature points.

In operation 940, the LSTM model part 140 may generate an input of an LSTM model by combining the feature point map of the input image output in operation 930, the LiDAR distance information, and the acceleration information that are output in operation 920. In addition, the LSTM model part 140 may learn a collision alert situation by inputting the generated input to the LSTM model. The FNN model part 150 may determine a collision situation using an output of the LSTM model and an FNN model. The FNN model part 150 may select, from among three outputs (normal driving, collision alert, collision detection) generated by the FNN model from which an output of the LSTM model is received, the greatest probability distribution value based on a normal distribution of the three outputs and determine the collision situation based on the selected output.

In operation 950, the FNN model part 150 may determine a cost function for optimizing a training model by comparing the collision situation determined using the FNN model and an actual situation.

In operation 960, the feature point map generator 130, the LSTM model part 140, and the FNN model part 150 may optimize a training model of the feature point map generator 130, a training model of the LSTM model part 140, and a training model of the FNN model part 150 based on the cost function determined in operation 950.

In operation 970, the outputter 160 may output a result of the determining, which is determined by the FNN model part 150. The outputter 160 may provide, to the user, a result of detecting an object in a camera image, LiDAR cloud point information, and acceleration sensor information. The outputter 160 may provide classified results associated with normal driving, collision alert, and collision detection to the user.

The operations 950 and 960 may be performed after operation 970 or performed in parallel with the operation 970.

An example embodiment may provide a more stable system for detecting a collision by reducing disadvantages of sensors using tightly-coupled measurement values of the sensors providing different information than another.

An example embodiment may facilitate an immediate response by notifying a user about an abnormal situation when a possible collision with a detected obstacle is predicted or a collision occurs.

An example embodiment may ensure stable operation of an autonomous robot by notifying a user about an abnormal situation and facilitating an immediate response.

Meanwhile, the autonomous robot collision detection system or method may be written in a computer-executable program and may be implemented on various types of recording media such as magnetic storage media, optical reading media, or digital storage media.

The units described herein may be implemented using hardware components and software components. For example, the hardware components may include microphones, amplifiers, band-pass filters, audio to digital convertors, non-transitory computer memory and processing devices. A processing device may be implemented using one or more general-purpose or special purpose computers, such as, for example, a processor, a controller and an arithmetic logic unit (ALU), a digital signal processor, a microcomputer, a field programmable gate array (FPGA), a programmable logic unit (PLU), a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such a parallel processors.

The software may include a computer program, a piece of code, an instruction, or some combination thereof, to independently or collectively instruct or configure the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. The software and data may be stored by one or more non-transitory computer readable recording mediums. The non-transitory computer readable recording medium may include any data storage device that can store data which can be thereafter read by a computer system or processing device.

The methods according to the above-described example embodiments may be recorded in non-transitory computer-readable media including program instructions to implement various operations of the above-described example embodiments. The media may also include, alone or in combination with the program instructions, data files, data structures, and the like. The program instructions recorded on the media may be those specially designed and constructed for the purposes of example embodiments, or they may be of the kind well-known and available to those having skill in the computer software arts. Examples of non-transitory computer-readable media include magnetic media such as hard disks, floppy disks, and magnetic tape; optical media such as CD-ROM discs, DVDs, and/or Blue-ray discs; magneto-optical media such as optical discs; and hardware devices that are specially configured to store and perform program instructions, such as read-only memory (ROM), random access memory (RAM), flash memory (e.g., USB flash drives, memory cards, memory sticks, etc.), and the like. Examples of program instructions include both machine code, such as produced by a compiler, and files containing higher level code that may be executed by the computer using an interpreter.

The above-described devices may be configured to act as one or more software modules in order to perform the operations of the above-described example embodiments, or vice versa.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner and/or replaced or supplemented by other components or their equivalents.

Therefore, the scope of the disclosure is defined not by the detailed description, but by the claims and their equivalents, and all variations within the scope of the claims and their equivalents are to be construed as being included in the disclosure.

What is claimed is:

1. A method of detecting a collision by an autonomous robot, the method comprising:
   performing preprocess such as distortion correction by a camera lens, illumination effect correction, and contrast equalization on the input image received from an autonomous robot;
   performing preprocess to extract from 360° point cloud information based on a position of an installed sensor received from light detection and ranging (LiDAR), distance information associated with a point cloud in front of an autonomous robot on a movement path in operation;
   removing three-axis gravitational acceleration and a sensor bias from the three-axis acceleration information received from acceleration sensor, performing preprocess with a high-pass filter for filtering in operation, and output acceleration information;
   generating an input of a long short-term memory (LSTM) model by combining the preprocessed input image, the distance information, and the acceleration information;
   learning a collision alert situation by inputting the input to the LSTM model; and
   determining a collision situation using an output of the LSTM model and a fully connected neural network (FNN) model.

2. The method of claim 1, wherein the LSTM model is configured to:
   learn, when an obstacle is detected using the distance information, but the obstacle is not detected using the preprocessed input image, as a normal situation learn, when an obstacle is detected using the distance information, and the obstacle is detected using the preprocessed input image, as a collision alert situation; and learn, when the distance information and a feature point map of the input image decrease, but the acceleration information increases, as the collision situation.

3. The method of claim 1, wherein the determining of the collision situation comprises, from among three outputs (normal driving, collision alert, collision detection) generated by the FNN model, selecting an output in which a probability distribution value is the greatest based on a normal distribution of the three outputs, and determining the collision situation based on the selected output.

4. The method of claim 1, further comprising:
determining a cost function for optimizing a training model by comparing the collision situation determined using the FNN model and an actual situation; and
optimizing a training model of the LSTM model and a training model of the FNN model based on the cost function.

5. The method of claim 1, further comprising:
generating, from the preprocessed input image, a feature point map of the input image,
wherein the generating of the input of the LSTM model comprises combining the feature point map of the input image, the LiDAR distance information, and the acceleration information.

6. The method of claim 5, wherein the generating of the feature point map comprises:
extracting feature points from the input image using a convolution filter of a preset size and reducing a size of the input image;
linearizing the extracted feature points; and
dividing the linearized feature points by a preset size and generating the feature point map using representative values of the divided feature points.

7. A non-transitory computer-readable storage medium storing instructions that, when executed by a processor, cause the processor to perform the method of claim 1.

8. A system for detecting a collision by an autonomous robot, the system comprising:
preprocessor to:
perform preprocessing such as distortion correction by a camera lens, illumination effect correction, and contrast equalization on the input image received from an autonomous robot;
perform preprocessing to extract, from 360° point cloud information based on a position of an installed sensor received from light detection and ranging (LiDAR), distance information associated with a point cloud in front of an autonomous robot on a movement path in operation; and
remove three-axis gravitational acceleration and a sensor bias from the three-axis acceleration information received from acceleration sensor, perform preprocessing with a high-pass filter for filtering in operation, and output acceleration information;
a long short-term memory (LSTM) model part configured to:
generate an input of an LSTM model by combining the preprocessed input image, the distance information, and the acceleration information; and
learn a collision alert situation by inputting the input to the LSTM model; and
a fully connected neural network (FNN) model part configured to determine a collision situation using an output of the LSTM model and an FNN model.

9. The system of claim 8, wherein the LSTM model is configured to:
learn, when an obstacle is detected using the distance information, but the obstacle is not detected using the preprocessed input image, as a normal situation
learn, when an obstacle is detected using the distance information, and the obstacle is detected using the preprocessed input image, as a collision alert situation; and
learn, when the distance information and a feature point map of the input image decrease, but the acceleration information increases, as the collision situation.

10. The system of claim 8, wherein the FNN model part is configured to, from among three outputs (normal driving, collision alert, collision detection) generated by the FNN model, select an output in which a probability distribution value is the greatest based on a normal distribution of the three outputs and determine the collision situation based on the selected output.

11. The system of claim 8, wherein the FNN model part is configured to determine a cost function for optimizing a training model by comparing the collision situation determined using the FNN model and an actual situation, and optimize a training model of the FNN model based on the cost function,
wherein the LSTM model is configured to optimize a training model of the LSTM model based on the cost function.

12. The system of claim 8, further comprising:
a feature point map generator configured to generate, from the preprocessed input image, a feature point map of the input image,
wherein the LSTM model part is configured to combine the feature point map of the input image, the LiDAR distance information, and the acceleration information.

13. The system of claim 12, wherein the feature point map generator is configured to extract feature points from the input image using a convolution filter of a preset size, reduce a size of the input image, linearize the extracted feature points, divide the linearized feature points by a preset size, and generate the feature point map using representative values of the divided feature points.

* * * * *